(12) United States Patent
Oya

(10) Patent No.: US 9,896,128 B2
(45) Date of Patent: Feb. 20, 2018

(54) STEERING ASSIST DEVICE

(71) Applicant: JTEKT CORPORATION, Osaka (JP)

(72) Inventor: Toshiaki Oya, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/176,843

(22) Filed: Jun. 8, 2016

(65) Prior Publication Data

US 2016/0362136 A1   Dec. 15, 2016

(30) Foreign Application Priority Data

Jun. 15, 2015 (JP) ................................ 2015-120563

(51) Int. Cl.
*B62D 15/02* (2006.01)
*B62D 5/04* (2006.01)
*B60R 1/00* (2006.01)

(52) U.S. Cl.
CPC .............. *B62D 15/025* (2013.01); *B60R 1/00* (2013.01); *B62D 5/0409* (2013.01); *B62D 5/0454* (2013.01); *B62D 5/0463* (2013.01)

(58) Field of Classification Search
None
See application file for complete search history.

(56) References Cited

U.S. PATENT DOCUMENTS

| 5,979,581 | A | * | 11/1999 | Ravani | ...................... | B60T 7/16 |
| | | | | | | 180/168 |
| 6,321,159 | B1 | * | 11/2001 | Nohtomi | .................. | B62D 1/28 |
| | | | | | | 340/903 |

| 2004/0204808 | A1 | | 10/2004 | Satoh et al. |
| 2006/0030987 | A1 | | 2/2006 | Akita |
| 2007/0225914 | A1 | * | 9/2007 | Kawazoe ............. B62D 15/025 |
| | | | | 701/301 |
| 2008/0047775 | A1 | | 2/2008 | Yamazaki |
| 2011/0015850 | A1 | | 1/2011 | Tange et al. |
| 2016/0288830 | A1 | * | 10/2016 | Hori ..................... B62D 15/025 |

FOREIGN PATENT DOCUMENTS

| EP | 2325069 A1 | 5/2011 |
| JP | H11-34774 A | 2/1999 |
| JP | 4292562 B2 | 7/2009 |
| JP | 2013-212839 A | 10/2013 |

OTHER PUBLICATIONS

Nov. 23, 2016 Extended Search Report issued in European Patent Application No. 16174136.8.

* cited by examiner

*Primary Examiner* — Rodney A Butler
*Assistant Examiner* — Tamara L Weber
(74) *Attorney, Agent, or Firm* — Oliff PLC

(57) ABSTRACT

In a steering assist device, a correction gain setting unit sets correction gain to one if it determines that that the sign of a lateral deviation change rate is different from that of a second derivative value of a lateral deviation. The correction gain setting unit sets the correction gain to a predetermined value that is larger than one, if it determines that that the sign of the lateral deviation change rate is the same as that of the second derivative value of the lateral deviation. A gain multiplication unit corrects a lane keep assist current value calculated by a lane keep assist current value calculation unit by multiplying the lane keep assist current value by the correction gain set by the correction gain setting unit.

4 Claims, 14 Drawing Sheets

STEERING ASSIST DEVICE

INCORPORATION BY REFERENCE

The disclosure of Japanese Patent Application No. 2015-120563 filed on Jun. 15, 2015 including the specification, drawings and abstract, is incorporated herein by reference in its entirety.

BACKGROUND OF THE INVENTION

1. Field of the Invention

The present invention relates to steering assist devices for vehicles, and more particularly to steering assist devices that prevent a running vehicle from deviating from its lane.

2. Description of the Related Art

If a vehicle deviates from its lane on a highway etc. due to driver's carelessness or a road surface condition, there is a risk that the vehicle may contact other vehicle(s) or a guardrail. As a solution, lane departure warning systems are developed which obtain road surface information and relative position information between the vehicle and its lane based on an image shot by a camera mounted on the vehicle and warn the driver when the vehicle is about to deviate from its lane. See, e.g., Japanese Patent Application Publication No. 2013-212839 (JP 2013-212839 A), Japanese Patent No. 4292562 (JP 4292562 B), and Japanese Patent Application Publication No. H11-34774 (JP H11-34774 A).

SUMMARY OF THE INVENTION

It is one object of the present invention to provide a steering assist device that can quickly return a vehicle to a target travel line when it deviates from the target travel line.

According to one aspect of the present invention, a steering assist device includes: an electric motor that applies a steering driving force to a steering operation mechanism of a vehicle; an information obtaining unit that obtains a lateral deviation of the vehicle from a target travel line, a lateral deviation change rate or a rate of change in the lateral deviation per unit time, and a rate of change in the lateral deviation change rate per unit time; a steering assist current value setting unit that sets a steering assist current value corresponding to a target value of steering assist torque; a lane keep assist current value calculation unit that calculates a lane keep assist current value that makes the lateral deviation and the lateral deviation change rate closer to zero, based on the lateral deviation and the lateral deviation change rate obtained by the information obtaining unit; a correction unit that corrects the lane keep assist current value calculated by the lane keep assist current value calculation unit so that an absolute value of the lane keep assist current value increases, if the lateral deviation change rate and the rate of change in the lateral deviation change rate per unit time obtained by the information obtaining unit have the same sign; a target current value calculation unit that calculates a target current value by using the steering assist current value set by the steering assist current value setting unit and the lane keep assist current value corrected by the correction unit; and a control unit that drivingly controls the electric motor based on the target current value calculated by the target current value calculation unit.

The steering assist device of the above aspect can generate lane keep assist torque that makes the lateral deviation and the lateral deviation change rate closer to zero. Since the vehicle is thus guided so as to make the lateral deviation closer to zero, the vehicle can be guided toward the target travel line. Moreover, since the vehicle is guided so as to make the lateral deviation change rate closer to zero, the vehicle can be guided so as to make a lateral centerline of the vehicle parallel to the target travel line when the vehicle is traveling near the target travel line. The vehicle can thus be guided so as to avoid deviating from its lane.

In the steering assist device of the above aspect, the lane keep assist current value calculated by the lane keep assist current value calculation unit is corrected so that the absolute value of the lane keep assist current value increases, if the lateral deviation change rate and the rate of change in the lateral deviation change rate per unit time have the same sign. The case where both the lateral deviation change rate and the rate of change in the lateral deviation change rate per unit time have the same sign corresponds to the state where the degree to which the vehicle deviates from the target travel line is increasing. The state where the degree to which the vehicle deviates from the target travel line is increasing refers to the state where both the lateral deviation and the lateral deviation change rate are changing in a direction away from zero. Accordingly, in the present invention, the lane keep assist torque can be increased in the state where the degree to which the vehicle deviates from the target travel line is increasing. The vehicle can therefore be rapidly returned toward the target travel line if it deviates from the target travel line.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described in detail below with reference to the accompanying drawings.

Figure 1:
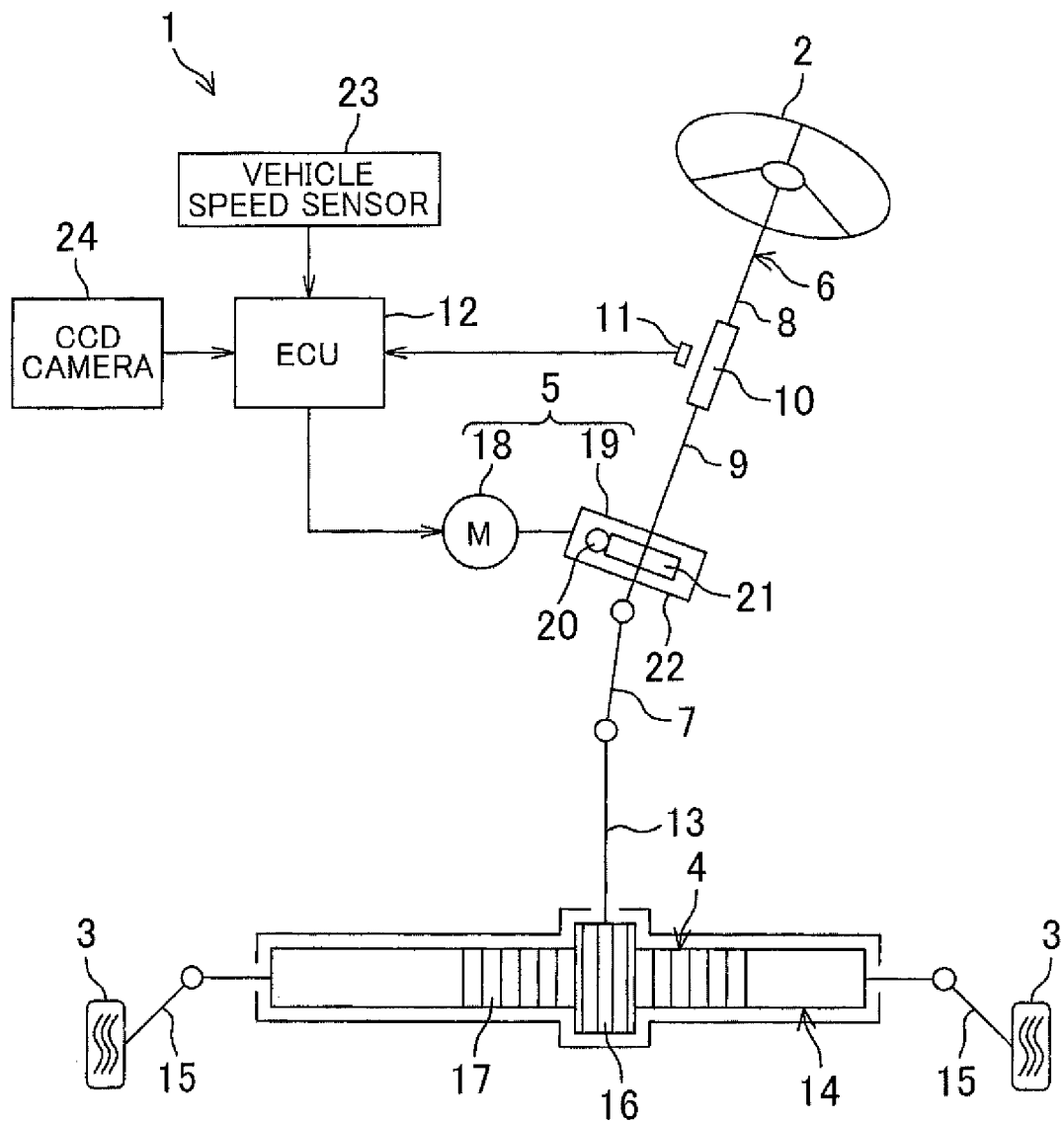
FIG. 1 is a schematic diagram showing a schematic configuration of an electric power steering system to which a steering assist device according to an embodiment of the present invention is applied.

FIG. 1 is a schematic diagram showing a schematic configuration of an electric power steering system to which a steering assist device according to an embodiment of the present invention is applied.

An electric power steering system (EPS) 1 includes a steering wheel 2 serving as a steering member that steers a vehicle, a steering operation mechanism 4 that steers steered wheels 3 in accordance with the rotation of the steering wheel 2, and a steering assist mechanism 5 that assists driver's steering operation. The steering wheel 2 and the steering operation mechanism 4 are mechanically coupled to each other via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are coupled to each other via a torsion bar 10 so as to be rotatable relative to each other.

A torque sensor 11 is disposed around the torsion bar 10. The torque sensor 11 detects steering torque T applied to the steering wheel 2, based on the relative rotation displacement between the input shaft 8 and the output shaft 9. For example, in the present embodiment, the torque sensor 11 detects torque for steering to the right as positive steering torque T and detects torque for steering to the left as negative steering torque T. The larger the absolute value of the detected steering torque T is, the larger the magnitude of the steering torque T is.

The steering operation mechanism 4 is a rack and pinion mechanism including a pinion shaft 13 and a rack shaft 14 serving as a steering operation shaft. The steered wheels 3 are each coupled to corresponding one of the ends of the rack shaft 14 via a tie rod 15 and a knuckle arm (not shown). The pinion shaft 13 is coupled to the intermediate shaft 7. The pinion shaft 13 rotates in accordance with the steering operation of the steering wheel 2. A pinion 16 is coupled to the tip end (the lower end in FIG. 1) of the pinion shaft 13.

The rack shaft 14 extends linearly in the lateral direction of the vehicle. The rack shaft 14 has a rack 17 in its intermediate portion in the axial direction. The rack 17 meshes with the pinion 16. The pinion 16 and the rack 17 convert rotation of the pinion shaft 13 to axial movement of the rack shaft 14. The steered wheels 3 can be steered by moving the rack shaft 14 in the axial direction.

When the steering wheel 2 is rotated by driver's steering operation, this rotation of the steering wheel 2 is transmitted to the pinion shaft 13 via the steering shaft 6 and the intermediate shaft 7. Rotation of the pinion shaft 13 is converted to axial movement of the rack shaft 14 by the pinion 16 and the rack 17. The steered wheels 3 are thus steered.

The steering assist mechanism 5 includes a steering assist electric motor 18 and a speed reduction mechanism 19. The electric motor 18 generates a steering assist force (steering assist torque), and the speed reduction mechanism 19 transmits the output torque of the electric motor 18 to the steering operation mechanism 4. The speed reduction mechanism 19 is a worm gear mechanism that includes a worm shaft 20 and a worm wheel 21 meshing with the worm shaft 20. The speed reduction mechanism 19 is accommodated in a gear housing 22 serving as a transmission mechanism housing.

The worm shaft 20 is rotationally driven by the electric motor 18. The worm wheel 21 is coupled to the steering shaft 6 so as to be rotatable in the same direction as the steering shaft 6. The worm wheel 21 is rotationally driven by the worm shaft 20.

When the worm shaft 20 is rotationally driven by the electric motor 18, the worm wheel 21 is rotationally driven and the steering shaft 6 is rotated accordingly. The rotation of the steering shaft 6 is transmitted to the pinion shaft 13 via the intermediate shaft 7. Rotation of the pinion shaft 13 is converted to axial movement of the rack shaft 14, whereby the steered wheels 3 are steered. That is, the steered wheels 3 are steered by rotationally driving the worm shaft 20 by the electric motor 18. The electric motor 18 is a motor that generates a steering driving force for steering the steered wheels 3.

The vehicle is provided with a vehicle speed sensor 23 that detects the vehicle speed V. A charge coupled device (CCD) camera 24 is also mounted on the vehicle. The CCD camera 24 shoots the road ahead in the direction in which the vehicle is traveling.

The steering torque T detected by the torque sensor 11, the vehicle speed V detected by the vehicle speed sensor 23, and an image signal output from the CCD camera 24 are input to an electronic control unit (ECU) 12. The ECU 12 controls the electric motor 18 based on these input signals.

Figure 2:
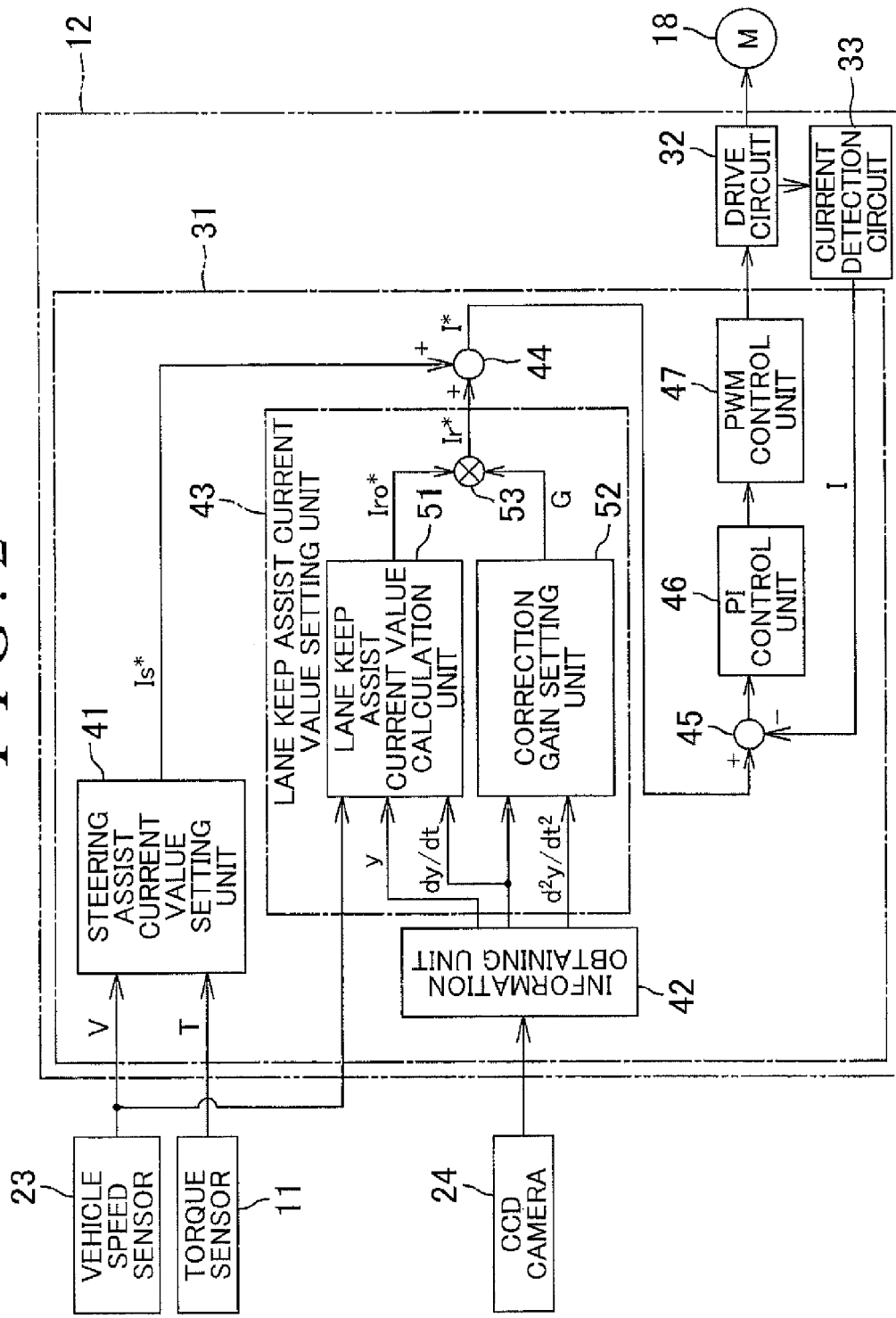
FIG. 2 is a block diagram showing an electrical configuration of an electronic control unit (ECU)

FIG. 2 is a block diagram showing an electrical configuration of the ECU 12.

The ECU 12 includes a microcomputer 31, a drive circuit (inverter circuit) 32, and a current detection circuit 33. The microcomputer 31 controls the electric motor 18. The drive circuit 32 is controlled by the microcomputer 31 to supply electric power to the electric motor 18. The current detection circuit 33 detects a motor current (actual current value) I flowing in the electric motor 18.

The microcomputer 31 includes a central processing unit (CPU) and a memory (a read only memory (ROM), a random access memory (RAM), a nonvolatile memory, etc.). The microcomputer 31 functions as a plurality of functional processing units by executing a predetermined program. The plurality of functional processing units include a steering assist current value setting unit 41, an information obtaining unit 42, a lane keep assist current value setting unit 43, a target current value calculation unit 44, a current deviation calculation unit 45, a proportional-integral (PI) control unit 46, and a pulse width modulation (PWM) control unit 47.

Figure 3:
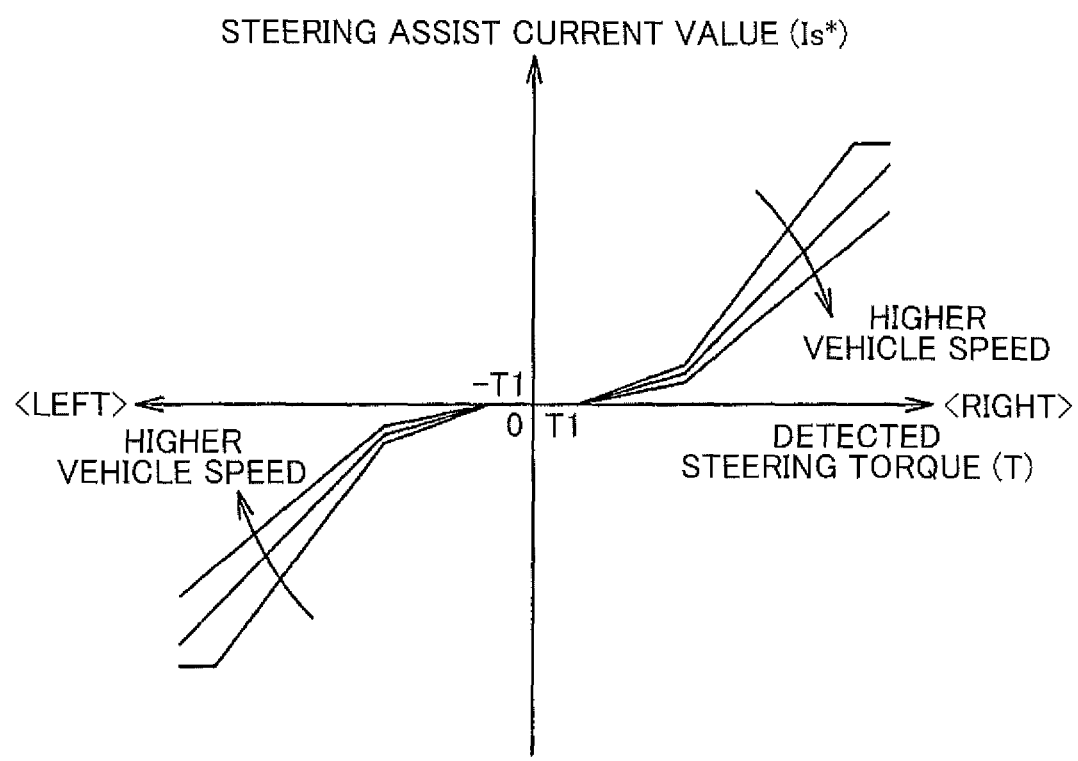
FIG. 3 is a graph showing an example of setting a steering assist current value Is* with respect to detected steering torque T.

The steering assist current value setting unit 41 sets a steering assist current value Is* that is a motor current value corresponding to a target value of the steering assist torque. The steering assist current value setting unit 41 sets the steering assist current value Is* based on the steering torque T detected by the torque sensor 11 and the vehicle speed V detected by the vehicle speed sensor 23. FIG. 3 shows an example of setting the steering assist current value Is* with respect to the detected steering torque T. For example, the detected steering torque T takes a positive value in the case where it is the torque for steering to the right, and takes a negative value in the case where it is the torque for steering to the left. The steering assist current value Is* is set to a positive value when a steering assist force for steering to the right should be generated by the electric motor 18, and is set to a negative value when a steering assist force for steering to the left should be generated by the electric motor 18.

The steering assist current value Is* takes a positive value when the detected steering torque T has a positive value, and takes a negative value when the detected steering torque T has a negative value. The steering assist current value Is* is set to zero when the detected steering torque T has a very small value in the range of −T1 to T1 (torque dead band) (e.g., T1=0.4 N·m). In the case where the detected steering torque T is out of the range of −T1 to T1, the steering assist current value Is* is set so that its absolute value increases as the absolute value of the detected steering torque T increases. The steering assist current value Is* is set so that its absolute value decreases as the vehicle speed V detected by the vehicle speed sensor 23 increases. A large steering assist force can thus be generated when the vehicle is traveling at low speeds, and the steering assist force can be reduced when the vehicle is traveling at high speeds.

Figure 4:
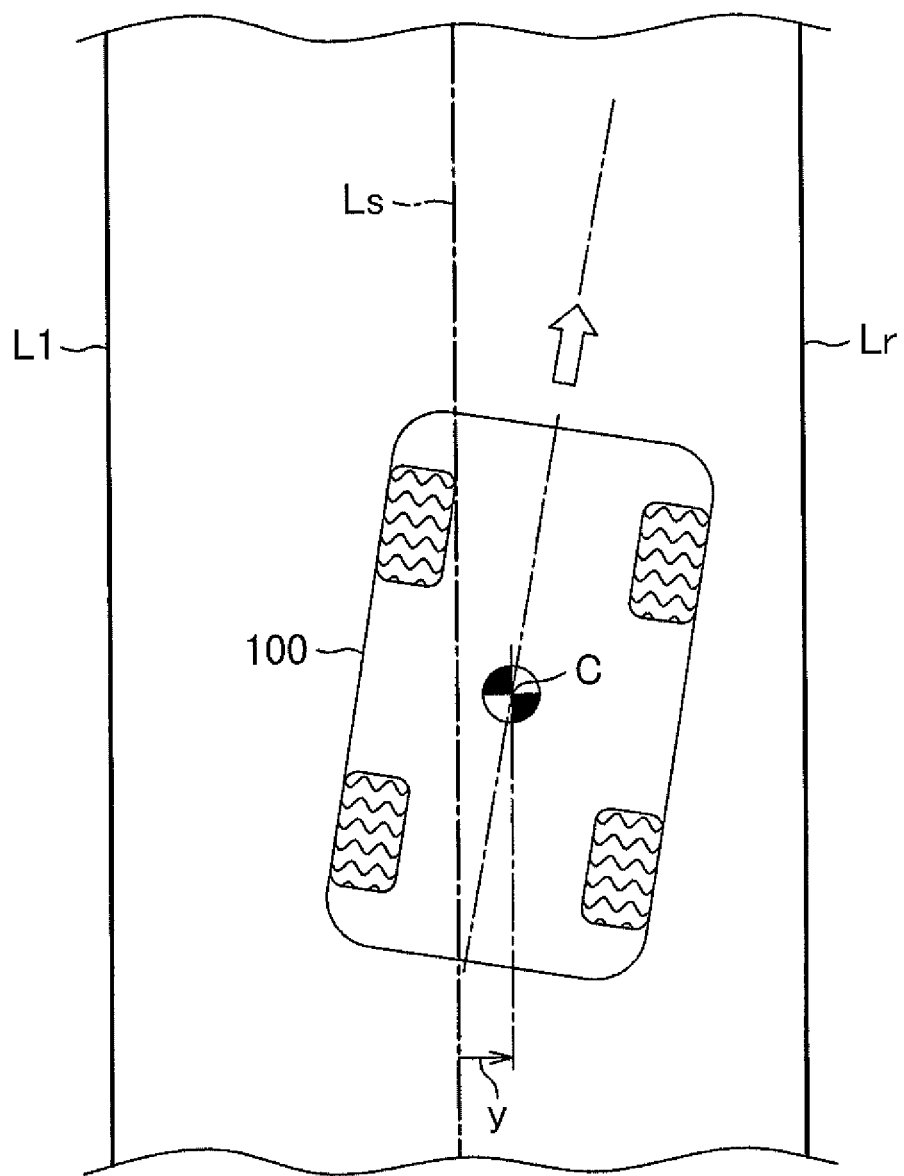
FIG. 4 is a schematic diagram illustrating operation of an information obtaining unit.

As shown in FIG. 4, the information obtaining unit 42 recognizes a pair of lane marking lines (white lines) Ll, Lr indicating a lane in which a vehicle 100 is traveling, and recognizes the lane in which the vehicle 100 is traveling, based on an image shot by the CCD camera 24. The information obtaining unit 42 sets a target travel line Ls of the vehicle 100 within the recognized lane. In the present embodiment, the target travel line Ls is set in the middle of the width of the vehicle's lane. The information obtaining unit 42 obtains a lateral deviation y of the vehicle 100 from the target travel line Ls, a lateral deviation change rate dy/dt, or a rate of change in lateral deviation y per unit time, and a change rate $d^2y/dt^2$, or a rate of change in lateral deviation change rate dy/dt per unit time. Hereinafter, the change rate $d^2y/dt^2$ (the rate of change in lateral deviation change rate dy/dt per unit time) is sometimes referred to as the "second derivative value $d^2y/dt^2$ of the lateral deviation y."

The lateral deviation y of the vehicle 100 represents the distance from a reference position C of the vehicle 100 to the target travel line Ls as viewed in plan. The reference position C of the vehicle 100 may be the position of the center of gravity of the vehicle 100 or may be the position where the CCD camera 24 is placed in the vehicle 100. In the present embodiment, the lateral deviation y is set so that the sign of the lateral deviation y is positive if the reference position C of the vehicle 100 is located on the right side of the target travel line Ls, and is negative if the reference position C of the vehicle 100 is located on the left side of the target travel line Ls, as viewed in the direction in which the vehicle 100 is traveling.

The lateral deviation change rate dy/dt may be the deviation (y(t)−y(t−Δt)) between a lateral deviation y(t) obtained this time and a lateral deviation y(t−Δt) obtained a predetermined unit time Δt ago. The lateral deviation change rate dy/dt may be the deviation (y(t+Δt)−y(t)) between a predicted lateral deviation y(t+Δt) after the predetermined unit time Δt and the lateral deviation y(t) obtained this time. The predicted lateral deviation y(t+Δt) may be obtained in view of the vehicle speed, the yaw angle, etc.

The lateral deviation change rate dy/dt may be the deviation (y(t+Δtx+Δt)−y(t+Δtx)) between a predicted lateral deviation y(t+Δtx) at time t1 after a predetermined time Δtx and a predicted lateral deviation y(t+Δtx+Δt) at time t2 that is the predetermined unit time Δt after time t1. The predicted lateral deviations y(t+Δtx), y(t+Δtx+Δt) may be obtained in view of the vehicle speed, the yaw angle, etc. Since a method for calculating or predicting the lateral deviation y of a vehicle by shooting the road ahead in the direction in which the vehicle is traveling is known in the art, as described in patent documents such as JP 2013-212839 A, JP 4292562 B, and JP H11-34774 A, description thereof will be omitted.

For example, the second derivative value $d^2y/dt^2$ of the lateral deviation y may be the deviation ((dy/dt)(t)−(dy/dt)(t−Δt)) between a lateral deviation change rate (dy/dt)(t) obtained this time and a lateral deviation change rate (dy/dt)(t−Δt) obtained a predetermined unit time Δt ago.

Referring back to FIG. 2, the lane keep assist current value setting unit 43 sets a lane keep assist current value Ir* based on the vehicle speed V, the lateral deviation y, the lateral deviation change rate dy/dt, and the second derivative value $d^2y/dt^2$ of the lateral deviation y. The lane keep assist current value Ir* is a value that is used to cause the vehicle 100 to travel along the target travel line Ls. The lane keep assist current value setting unit 43 will be described in detail later.

The target current value calculation unit 44 calculates a target current value I* by adding the lane keep assist current value Ir* set by the lane keep assist current value setting unit 43 to the steering assist current value Is* set by the steering assist current value setting unit 41. The current deviation calculation unit 45 calculates the deviation between the target current value I* obtained by the target current value calculation unit 44 and the actual current value I detected by the current detection circuit 33 (current deviation ΔI=I*−I).

The PI control unit 46 generates a drive command value by performing a PI operation on the current deviation ΔI calculated by the current deviation calculation unit 45. The drive command value is a value that is used to control the current I flowing in the electric motor 18 toward the target current value I*. The PWM control unit 47 generates a PWM control signal having a duty cycle corresponding to the drive command value and supplies the PWM control signal to the drive circuit 32. Electric power corresponding to the drive command value is thus supplied to the electric motor 18.

The current deviation calculation unit 45 and the PI control unit 46 form a current feedback controller. The current feedback controller serves to control the motor current I flowing in the electric motor 18 toward the target current value I*.

The lane keep assist current value setting unit 43 will be described in detail. As shown in FIG. 2, the lane keep assist current value setting unit 43 includes a lane keep assist current value calculation unit 51, a correction gain setting unit 52, and a gain multiplication unit 53.

The lane keep assist current value calculation unit 51 calculates a lane keep assist current value Iro* based on the lateral deviation y and the lateral deviation change rate dy/dt which are obtained by the information obtaining unit 42. The lane keep assist current value Iro* corresponds to lane keep assist torque that makes the lateral deviation y and the lateral deviation change rate dy/dt closer to zero.

Figure 5:
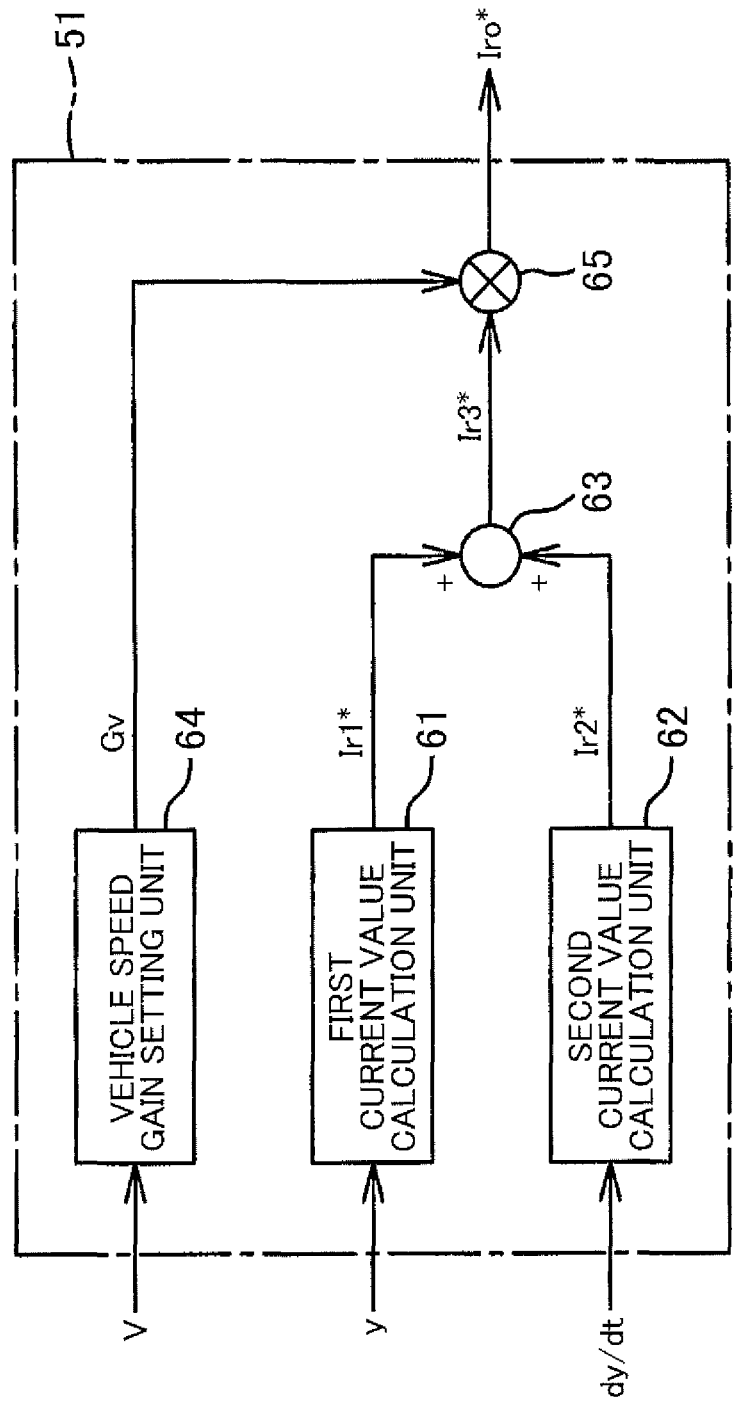
FIG. 5 is a block diagram showing an electrical configuration of a lane keep assist current value calculation unit.

FIG. 5 is a block diagram showing an electrical configuration of the lane keep assist current value calculation unit 51. The lane keep assist current value calculation unit 51 includes a first current value calculation unit 61, a second current value calculation unit 62, an addition unit 63, a vehicle speed gain setting unit 64, and a multiplication unit 65.

The first current value calculation unit 61 calculates a first lane keep assist current value Ir1* based on the lateral deviation y. The second current value calculation unit 62 calculates a second lane keep assist current value Ir2* based on the lateral deviation change rate dy/dt. The addition unit 63 calculates a third lane keep assist current value Ir3* (=Ir1*+Ir2*) by adding the first lane keep assist current value Ir1* calculated by the first current value calculation unit 61 and the second lane keep assist current value Ir2* calculated by the second current value calculation unit 62. The vehicle speed gain setting unit 64 sets vehicle speed gain Gv according to the vehicle speed V. The multiplication unit 65 calculates the lane keep assist current value Iro* (=Gv·(Ir1*+Ir2*)) by multiplying the third lane keep assist current value Ir3*(=In1*+Ir2*) calculated by the addition unit 63 by the vehicle speed gain Gv set by the vehicle speed gain setting unit 64. The lane keep assist current value Iro* is applied to the gain multiplication unit 53.

The first current value calculation unit 61, the second current value calculation unit 62, and the vehicle speed gain setting unit 64 will be more specifically described.

The first current value calculation unit 61 calculates the first lane keep assist current value Ir1* based on a map or an arithmetic expression that represents the relationship of the first lane keep assist current value Ir1* to the preset lateral deviation y. The second current value calculation unit 62 calculates the second lane keep assist current value Ir2* based on a map or an arithmetic expression that represents the relationship of the second lane keep assist current value Ir2* to the preset lateral deviation change rate dy/dt.

It is preferable that the first current value calculation unit 61 and the second current value calculation unit 62 calculate the first lane keep assist current value Ir1* and the second lane keep assist current value Ir2* as follows, where a1 and a2 represent constants of the same sign, b1 represents a degree of a natural number of two or larger, and b2 represents a degree of a natural number smaller than b1.

In the case where b1 is set to an odd number, it is preferable that the first current value calculation unit 61 calculate the first lane keep assist current value Ir1* based on the relationship between y and Ir1* as given by the function $Ir1^* = a1 \cdot y^{b1}$. In the case where b1 is set to an even number, it is preferable that the first current value calculation unit 61 calculate the first lane keep assist current value Ir1* based on the relationship between y and Ir1* as given by the function $Ir1^* = a1 \cdot y^{b1}$ for $y \geq 0$ and given by the function $Ir1^* = -a1 \cdot y^{b1}$ for $y < 0$.

In the case where b2 is set to an odd number, it is preferable that the second current value calculation unit 62 calculate the second lane keep assist current value Ir2* based on the relationship between dy/dt and Ir2* as given by the function $Ir2^* = a2 \cdot (dy/dt)^{b2}$. In the case where b2 is set to an even number, it is preferable that the second current value calculation unit 62 calculate the second lane keep assist current value Ir2* based on the relationship between dy/dt and Ir2* as given by the function $Ir2^*\ a2 \cdot (dy/dt)^{b2}$ for $dy/dt \geq 0$ and given by the function $Ir2^* = -a2 \cdot (dy/dt)^{b2}$ for $dy/dt < 0$.

As described above, in the present embodiment, the steering assist current value Is* is set to a positive value when a steering assist force for steering to the right should be generated by the electric motor 18, and is set to a negative value when a steering assist force for steering to the left should be generated by the electric motor 18. The lateral deviation y is set so that the sign of the lateral deviation y is positive if the reference position of the vehicle is located on the right side of the target travel line Ls, and is negative if the reference position of the vehicle is located on the left side of the target travel line Ls, as viewed in the direction in which the vehicle is traveling. In the case where the sign of the lateral deviation y is set in this manner, the constants a1, a2 are set to negative values.

In the case where both the sign of the steering assist current value Is* and the sign of the lateral deviation y are set in the opposite manner to the present embodiment, the constants a1, a2 are also set to negative values.

On the other hand, in the case where the sign of the steering assist current value Is* is set in a manner similar to the present embodiment and the sign of the lateral deviation y is set in the opposite manner to the present embodiment, or in the case where the sign of the steering assist current value Is* is set in the opposite manner to the present embodiment and the sign of the lateral deviation y is set in a manner similar to the present embodiment, the constants a1, a2 are set to positive values.

The reason why it is preferable that the first current value calculation unit 61 and the second current value calculation unit 62 calculate the first lane keep assist current value Ir1* and the second lane keep assist current value Ir2* in the manner described above will be described.

In general, in the case where a is a constant in the function given by $f(x)=ax^b$ (b represents a degree of a natural number), the absolute value of f(x) increases as the absolute value of x increases. In the case where the value of b is two or larger, the average rate of change increases as the absolute value of x increases. The average rate of change is the amount of change in f(x) divided by the amount of change in x.

In the case where the value of b1 is two or larger, the absolute value of the first lane keep assist current value Ir1* increases as the absolute value of the lateral deviation y increases, and the average rate of change (rate of increase in absolute value of the first lane keep assist current value Ir1*) increases as the absolute value of the lateral deviation y increases. The vehicle can therefore be more rapidly guided toward the target travel line (in the present embodiment, toward the middle of the width of the vehicle's lane).

In the function given by $f(x)=ax^b$, the average rate of change in the range where the absolute value of x is smaller than one decreases as the value of b increases. The average rate of change in the range where the absolute value of x is equal to or larger than one increases as the value of b increases.

When a1 is equal to a2 and b1 is larger than b2, the average rate of change in first lane keep assist current value Ir1* in the range where the absolute value of the lateral deviation y is smaller than one is lower than that in second lane keep assist current value Ir2* in the range where the absolute value of the lateral deviation change rate dy/dt is smaller than one. The average rate of change in first lane keep assist current value Ir1* in the range where the absolute value of the lateral deviation y is larger than one is higher than that in second lane keep assist current value Ir2* in the range where the absolute value of the lateral deviation change rate dy/dt is larger than one.

Accordingly, when the reference position of the vehicle is located in an area away from the target travel line, the function to make the lateral deviation y closer to zero by the first lane keep assist current value Ir1* tends to be stronger than that to make the lateral deviation change rate dy/dt closer to zero by the second lane keep assist current value Ir2*, even if the sign of the second lane keep assist current value Ir2* is opposite to that of the first lane keep assist current value Ir1*. The vehicle can therefore be guided toward the target travel line (in the present embodiment, toward the middle of the width of the vehicle's lane) even if the sign of the second lane keep assist current value Ir2* is opposite to that of the first lane keep assist current value Ir1*.

The second lane keep assist current value Ir2* according to the magnitude of the lateral deviation change rate dy/dt is obtained regardless of the value of the lateral deviation y. The vehicle can therefore be guided so as to make the lateral centerline of the vehicle parallel to the target travel line, even if the reference position of the vehicle is located in an area close to the target travel line.

Figure 6A:
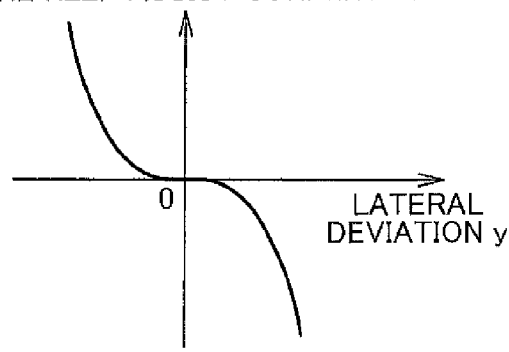
FIG. 6A is a graph showing an example of the relationship of a first lane keep assist current value Ir1* to a lateral deviation y.

In the present embodiment, the first current value calculation unit 61 calculates the first lane keep assist current value Ir1* based on a map storing the relationship of the first lane keep assist current value Ir1* to the lateral deviation y, as shown in FIG. 6A, or an arithmetic expression representing this relationship. In the example of FIG. 6A, the first lane keep assist current value Ir1* is represented by the cubic function Ir1*=a1·y$^3$, where a1 is a negative constant. That is, this function corresponds to the case where a1 is negative and b1 is three.

Figure 6B:
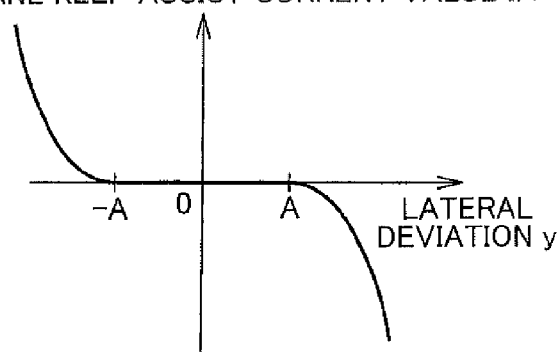
FIG. 6B is a graph showing another example of the relationship of the first lane keep assist current value Ir1* to the lateral deviation y.

For example, the first current value calculation unit 61 may calculate the first lane keep assist current value Ir1* based on a map storing the relationship of the first lane keep assist current value Ir1* to the lateral deviation y, as shown in FIG. 6B, or an arithmetic expression representing this relationship. The curve shown in FIG. 6B is created by translating the curve in the region where Ir1* is zero or larger in FIG. 6A in the direction of the abscissa by −A (A>0) and translating the curve in the region where Ir1* is smaller than zero in FIG. 6A in the direction of the abscissa by +A. In the curve of FIG. 6B, a dead band where the first lane keep assist current value Ir1* is zero is set in the range where the lateral deviation y is −A (A>0) to A.

Figure 6C:
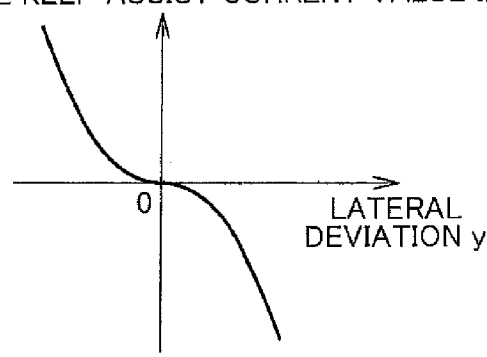
FIG. 6C is a graph showing still another example of the relationship of the first lane keep assist current value Ir1* to the lateral deviation y.

For example, the first current value calculation unit 61 may calculate the first lane keep assist current value Ir1* based on a map storing the relationship of the first lane keep assist current value Ir1* to the lateral deviation y, as shown in FIG. 6C, or an arithmetic expression representing this relationship. In the example of FIG. 6C, the first lane keep assist current value Ir1* is given by the quadratic function Ir1*=a1·y$^2$ for y≥0 and is given by the quadratic function Ir1*=−a1·y$^2$ for y<0, where a1 is a negative constant. This function corresponds to the case where a1 is negative and b1 is two.

Figure 7A:
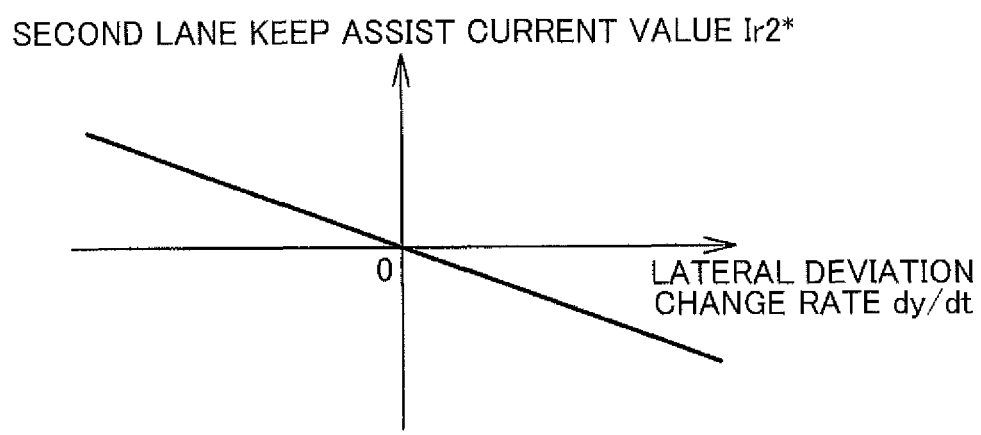
FIG. 7A is a graph showing an example of the relationship of a second lane keep assist current value Ir2* to a lateral deviation change rate dy/dt.

In the present embodiment, the second current value calculation unit 62 calculates the second lane keep assist current value Ir2* based on a map storing the relationship of the second lane keep assist current value Ir2* to the lateral deviation change rate dy/dt, as shown in FIG. 7A, or an arithmetic expression representing this relationship. In the example of FIG. 7A, the second lane keep assist current value Ir2* is represented by the linear function Ir2*=a2·dy/dt, where a2 is a negative constant. That is, this function corresponds to the case where a2 is negative and b2 is one. A dead band where the second lane keep assist current value Ir2* is zero may be set in the range where the absolute value of the lateral deviation change rate dy/dt is close to zero.

Figure 7B:
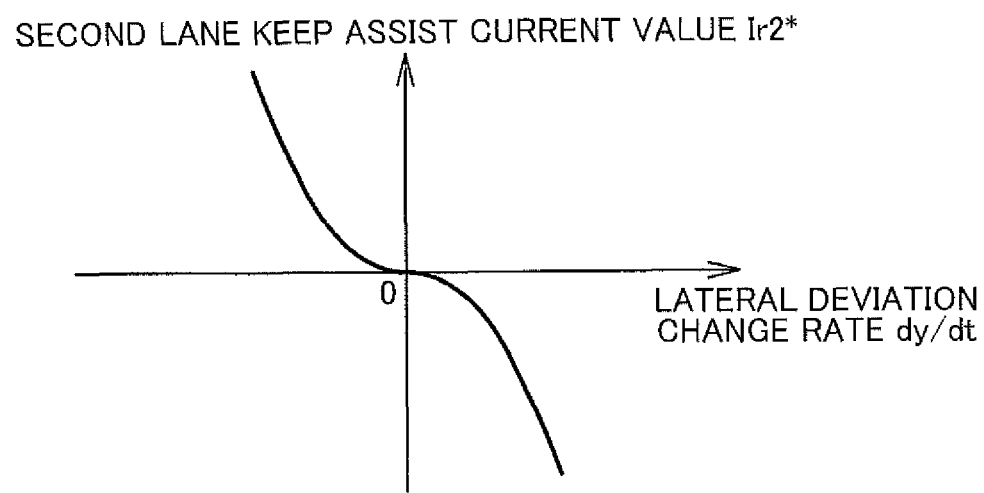
FIG. 7B is a graph showing another example of the relationship of the second lane keep assist current value Ir2* to the lateral deviation change rate dy/dt.

For example, the second current value calculation unit 62 may calculate the second lane keep assist current value Ir2* based on a map storing the relationship of the second lane keep assist current value Ir2* to the lateral deviation change rate dy/dt, as shown in FIG. 7B, or an arithmetic expression representing this relationship. In the example of FIG. 7B, the second lane keep assist current value Ir2* is given by the quadratic function Ir2*=a2·(dy/dt)$^2$ for dy/dt≥0 and is given by the quadratic function Ir2*=−a2·(dy/dt)$^2$ for dy/dt<0, where a2 is a negative constant. This function corresponds to the case where a2 is negative and b2 is two.

Figure 8:
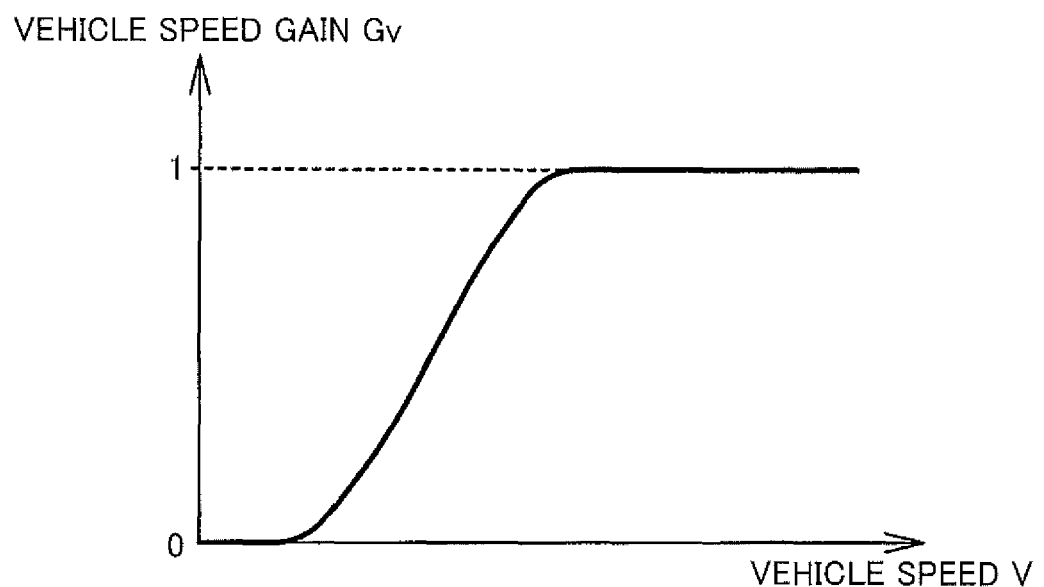
FIG. 8 is a graph showing an example of setting vehicle speed gain Gv with respect to a vehicle speed V.

Referring back to FIG. 5, the vehicle speed gain setting unit 64 sets the vehicle speed gain Gv based on the vehicle speed V detected by the vehicle speed sensor 23. FIG. 8 shows an example of setting the vehicle speed gain Gv with respect to the vehicle speed V. In the example of FIG. 8, the vehicle speed gain Gv is fixed to zero in the range where the vehicle speed V is close to zero, and is fixed to one in the range where the vehicle speed V is higher than a predetermined value. When the vehicle speed V is in the intermediate range, the vehicle speed gain G is set according to the characteristics in which the vehicle speed gain Gv increases from zero to one with the vehicle speed V.

The lane keep assist current value Iro* calculated by the lane keep assist current value calculation unit 51 is applied to the gain multiplication unit 53 (see FIG. 2).

Referring back to FIG. 2, the correction gain setting unit 52 sets correction gain G based on the lateral deviation change rate dy/dt and the second derivative value d$^2$y/dt$^2$ of the lateral deviation y which are obtained by the information obtaining unit 42. The correction gain G is used to correct the lane keep assist current value Iro* calculated by the lane keep assist current value calculation unit 51. Operation of the correction gain setting unit 52 will be described in detail later.

The gain multiplication unit 53 corrects the lane keep assist current value Iro* calculated by the lane keep assist current value calculation unit 51 by multiplying the lane keep assist current value Iro* by the correction gain G set by the correction gain setting unit 52. The corrected lane keep assist current value G·Iro* is applied as the final lane keep assist current value Ir* to the target current value calculation unit 44. The correction gain setting unit 52 and the gain multiplication unit 53 form a correction unit that corrects the lane keep assist current value Iro*.

Figure 9:
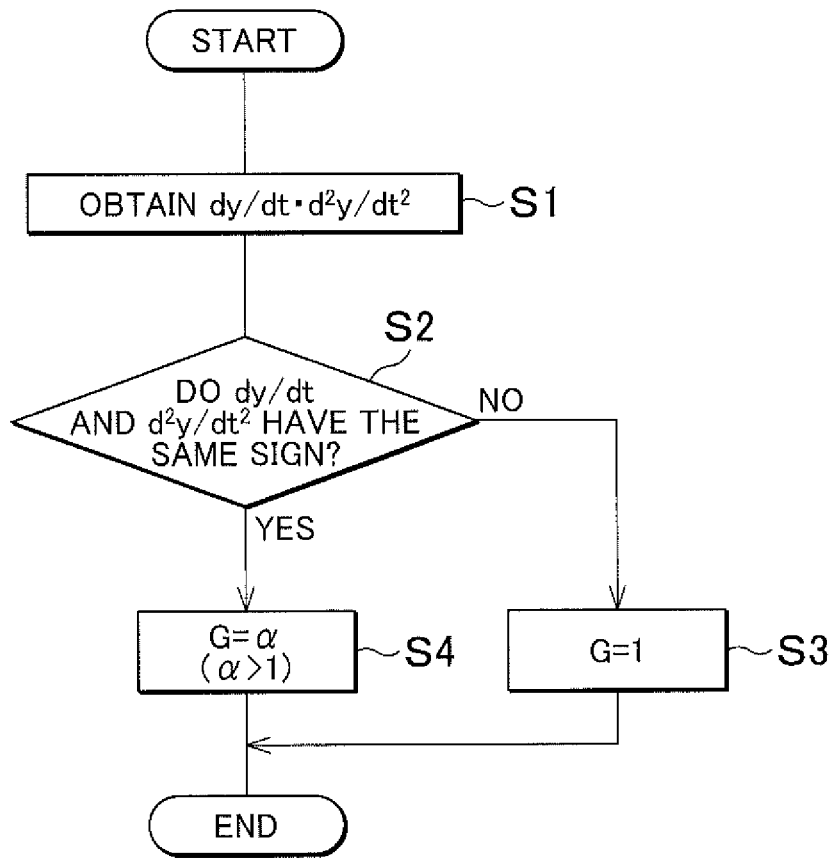
FIG. 9 is a flowchart illustrating an example of operation of a correction gain setting unit.

FIG. 9 is a flowchart illustrating an example of operation of the correction gain setting unit 52. The process of FIG. 9 is repeatedly performed in predetermined calculation cycles.

The correction gain setting unit 52 obtains the lateral deviation change rate dy/dt and the second derivative value d$^2$y/dt$^2$ of the lateral deviation y (step S1). The correction gain setting unit 52 determines if the sign of the lateral deviation change rate dy/dt is the same as that of the second derivative value d$^2$y/dt$^2$ of the lateral deviation y (step S2). For example, the correction gain setting unit 52 may determine that the sign of the lateral deviation change rate dy/dt is the same as that of the second derivative value d$^2$y/dt$^2$ of the lateral deviation y when the product of the lateral deviation change rate dy/dt and the second derivative value d$^2$y/dt$^2$ of the lateral deviation y is positive, and may determine that the sign of the lateral deviation change rate dy/dt is different from that of the second derivative value d$^2$y/dt$^2$ of the lateral deviation y when the product of the lateral deviation change rate dy/dt and the second derivative value d$^2$y/dt$^2$ of the lateral deviation y is zero or negative.

If the correction gain setting unit 52 determines that the sign of the lateral deviation change rate dy/dt is different from that of the second derivative value d$^2$y/dt$^2$ of the lateral deviation y (step S2: NO), it sets the correction gain G to one (step S3). In this case, the gain multiplication unit 53 outputs the lane keep assist current value Iro* calculated by the lane keep assist current value calculation unit 51 as it is. The correction gain setting unit 52 thus ends the process of the current calculation cycle.

If the correction gain setting unit 52 determines in step S2 that the sign of the lateral deviation change rate dy/dt is the same as that of the second derivative value $d^2y/dt^2$ of the lateral deviation y (step S2: YES), it sets the correction gain G to a predetermined value α that is larger than one (step S4). In this case, the gain multiplication unit 53 outputs the lane keep assist current value Ir* whose absolute value is larger than that of the lane keep assist current value Iro* calculated by the lane keep assist current value calculation unit 51 and whose sign is the same as that of the lane keep assist current value Iro* calculated by the lane keep assist current value calculation unit 51. The correction gain setting unit 52 thus ends the process of the current calculation cycle.

The reason why the correction gain setting unit 52 sets the correction gain G to the predetermined value α that is larger than one if it determines that the sign of the lateral deviation change rate dy/dt is the same as that of the second derivative value $d^2y/dt^2$ of the lateral deviation y will be described.

The state where both the lateral deviation y and the lateral deviation change rate dy/dt are changing in a direction away from zero corresponds to the state where the degree to which the vehicle deviates from the target travel line is increasing. In the state where both the lateral deviation y and the lateral deviation change rate dy/dt are changing in the direction away from zero, the sign of the lateral deviation change rate dy/dt or a first derivative value of the lateral deviation y is the same as that of the second derivative value $d^2y/dt^2$ of the lateral deviation y. Accordingly, if the sign of the lateral deviation change rate dy/dt or the first derivative value of the lateral deviation y is the same as that of the second derivative value $d^2y/dt^2$ of the lateral deviation y, it can be determined that the degree to which the vehicle deviates from the target travel line is increasing.

The correction gain setting unit 52 thus sets the correction gain G to the predetermined value α that is larger than one if the sign of the lateral deviation change rate dy/dt is the same as that of the second derivative value $d^2y/dt^2$ of the lateral deviation y. Accordingly, in the state where the degree to which the vehicle deviates from the target travel line is increasing, the lane keep assist current value Iro* calculated by the lane keep assist current value calculation unit 51 can be corrected so that its absolute value increases. The lane keep assist torque can thus be increased in the state where the degree to which the vehicle deviates from the target travel line is increasing. The vehicle can therefore be rapidly returned toward the target travel line if it deviates from the target travel line.

Figure 10:
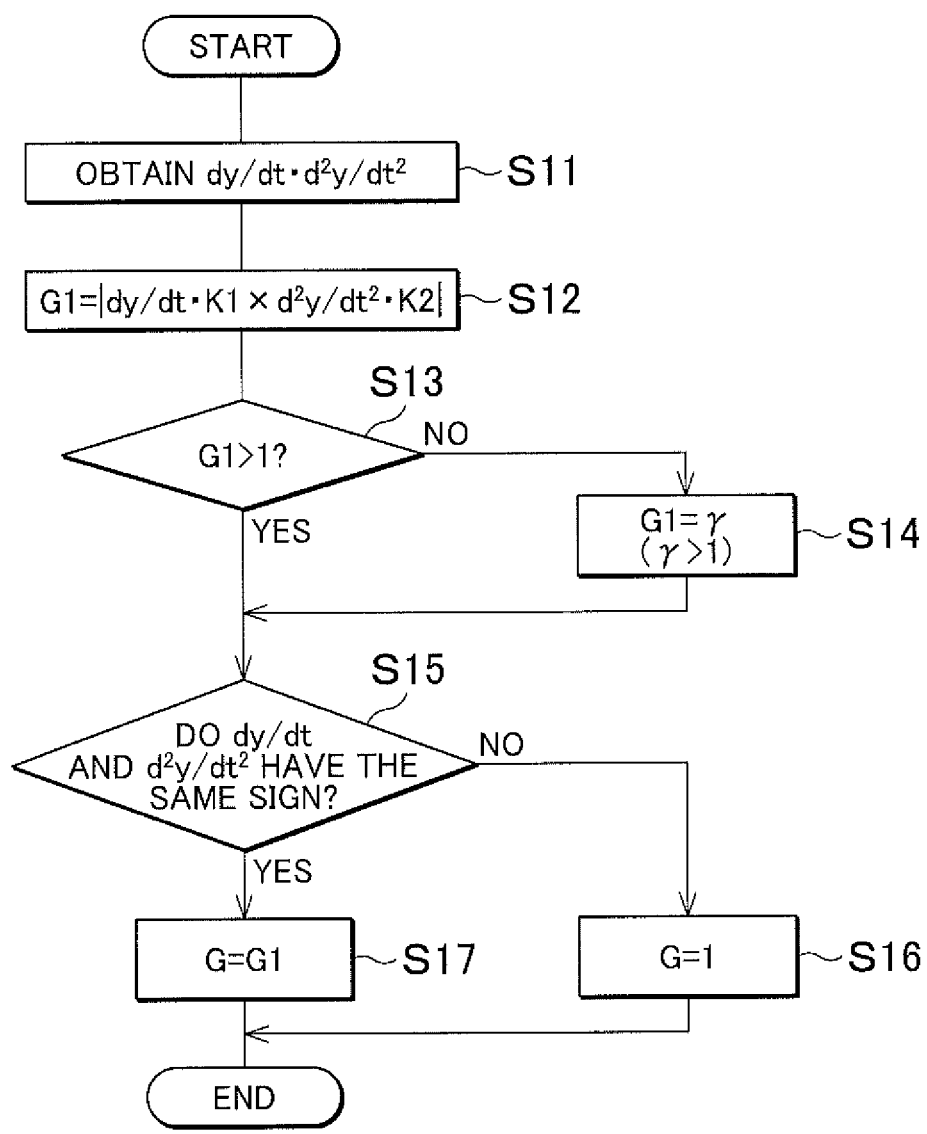
FIG. 10 is a flowchart illustrating another example of operation of the correction gain setting unit.

FIG. 10 is a flowchart illustrating another example of operation of the correction gain setting unit 52. The process of FIG. 10 is repeatedly performed in predetermined calculation cycles.

The correction gain setting unit 52 obtains the lateral deviation change rate dy/dt and the second derivative value $d^2y/dt^2$ of the lateral deviation y (step S11). The correction gain setting unit 52 calculates first correction gain G1 based on the following formula (1) (step S12).

$$G1=|(dy/dt)\cdot K1\times(d^2y/dt^2)\cdot K2| \quad (1)$$

where K1 and K2 represent preset positive coefficients.

The correction gain setting unit 52 then determines if the first correction gain G1 is larger than one (step S13).

If the first correction gain G1 is one or less (step S13: NO), the correction gain setting unit 52 sets the first correction gain G1 to a predetermined value γ larger than one (step S14) and proceeds to step S15. If the correction gain setting unit 52 determines in step S13 that the first correction gain G1 is larger than one (step S13: YES), it proceeds to step S15.

In step S15, the correction gain setting unit 52 determines if the sign of the lateral deviation change rate dy/dt is the same as that of the second derivative value $d^2y/dt^2$ of the lateral deviation y. For example, the correction gain setting unit 52 may determine that the sign of the lateral deviation change rate dy/dt is the same as that of the second derivative value $d^2y/dt^2$ of the lateral deviation y when the product of the lateral deviation change rate dy/dt and the second derivative value $d^2y/dt^2$ of the lateral deviation y is positive, and may determine that the sign of the lateral deviation change rate dy/dt is different from that of the second derivative value $d^2y/dt^2$ of the lateral deviation y when the product of the lateral deviation change rate dy/dt and the second derivative value $d^2y/dt^2$ of the lateral deviation y is zero or negative.

If the correction gain setting unit 52 determines that the sign of the lateral deviation change rate dy/dt is different from that of the second derivative value $d^2y/dt^2$ of the lateral deviation y (step S15: NO), it sets the final correction gain G to one (step S16). The correction gain setting unit 52 thus ends the process of the current calculation cycle.

If the correction gain setting unit 52 determines in step S15 that the sign of the lateral deviation change rate dy/dt is the same as that of the second derivative value $d^2y/dt^2$ of the lateral deviation y (step S15: YES), it sets the final correction gain G to the value of the first correction gain G1 (step S17). The correction gain setting unit 52 thus ends the process of the current calculation cycle.

In this modification, the correction gain G that is set if it is determined that the sign of the lateral deviation change rate dy/dt is the same as that of the second derivative value $d^2y/dt^2$ of the lateral deviation y is set according to the magnitudes of the lateral deviation change rate dy/dt and the second derivative value $d^2y/dt^2$ of the lateral deviation y. Since the correction gain G can thus be set according to the degree to which the vehicle deviates from the target travel line, the lane keep assist current value can be more appropriately corrected.

Figure 11:
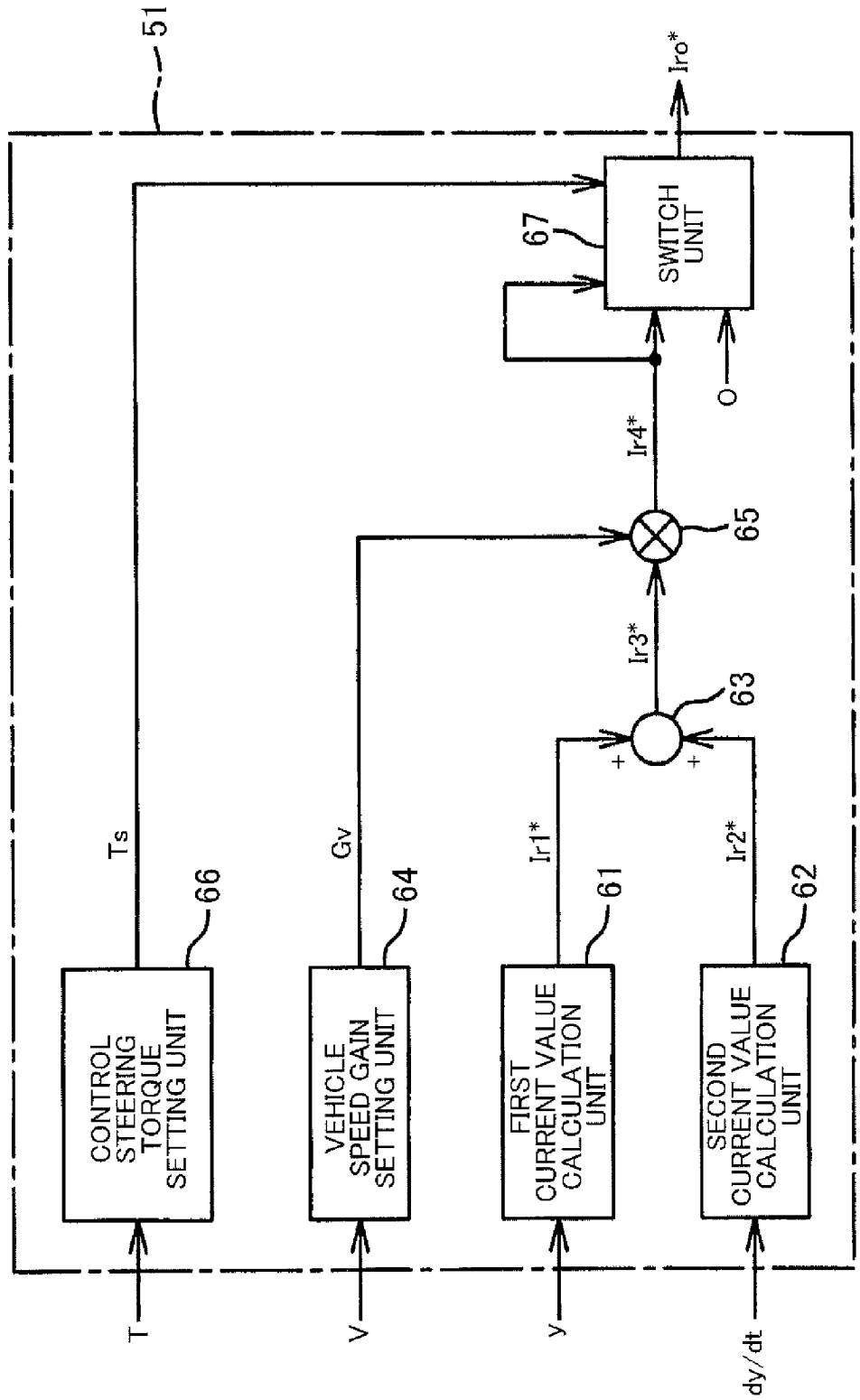
FIG. 11 is a block diagram showing a modification of the lane keep assist current value calculation unit.

FIG. 11 is a block diagram showing a modification of the lane keep assist current value calculation unit 51.

The lane keep assist current value calculation unit 51 includes a first current value calculation unit 61, a second current value calculation unit 62, an addition unit 63, a vehicle speed gain setting unit 64, a multiplication unit 65, a control steering torque setting unit 66, and a switch unit 67.

The first current value calculation unit 61 calculates a first lane keep assist current value Ir1* by an operation similar to that of the first current value calculation unit 61 in FIG. 5. The second current value calculation unit 62 calculates a second lane keep assist current value Ir2* by an operation similar to that of the second current value calculation unit 62 in FIG. 5. The addition unit 63 calculates a third lane keep assist current value Ir3*Ir1*+Ir2*) by adding the first lane keep assist current value Ir1* and the second lane keep assist current value Ir2*.

The vehicle speed gain setting unit 64 sets vehicle speed gain Gv according to the vehicle speed V by an operation similar to that of the vehicle speed gain setting unit 64 in FIG. 5. The multiplication unit 65 calculates a fourth lane keep assist current value Ir4*(=Gv·(Ir1*+Ir2*)) by multiplying the third lane keep assist current value Ir3* (Ir1*+Ir2*) by the vehicle speed gain Gv.

Figure 12:
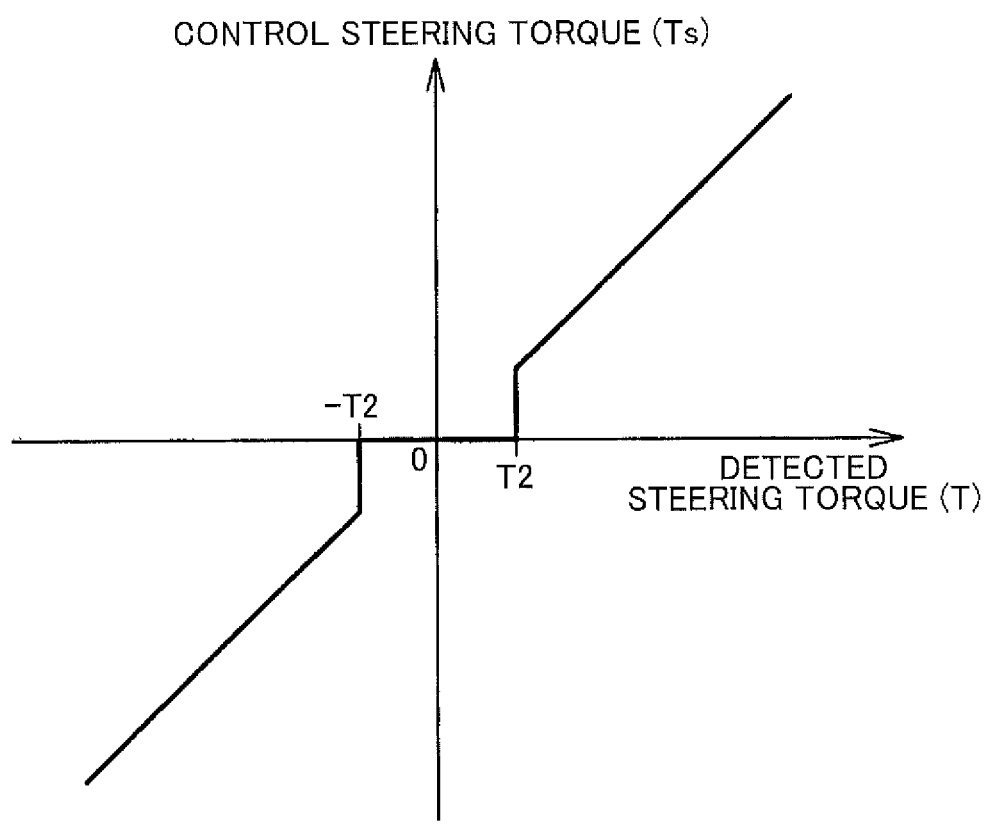
FIG. 12 is a graph showing the relationship between the detected steering torque T and control steering torque Ts.

The control steering torque setting unit 66 sets control steering torque Ts based on the detected steering torque T detected by the torque sensor 11. FIG. 12 shows an example of setting the control steering torque Ts with respect to the detected steering torque T. A dead band where the control steering torque Ts is zero is set in the region where the absolute value of the detected steering torque T is equal to or smaller than a predetermined value T2 (e.g., T2=0.4 N·m). The control steering torque Ts is set to have the same value as the detected steering torque T in the region where the detected steering torque T is larger than T2 and in the region where the detected steering torque T is smaller than −T2.

The fourth lane keep assist current value Ir4* calculated by the multiplication unit 65 is input to a first input terminal of the switch unit 67. Zero is input to a second input terminal of the switch unit 67. The control steering torque Ts calculated by the control steering torque setting unit 66 and the fourth lane keep assist current value Ir4* calculated by the multiplication unit 65 are applied to the switch unit 67 as switch control signals. The switch unit 67 selects one of the fourth lane keep assist current value Ir4* received at the first input terminal and zero received at the second input terminal based on the sign of the control steering torque Ts and the sign of the fourth lane keep assist current value Ir4*, and outputs the selected one of the fourth lane keep assist current value Ir4* and zero as a lane keep assist current value Iro*.

The sign of the control steering torque Ts represents the steering direction in which the driver steers the vehicle. The sign of the fourth lane keep assist current value Ir4* represents the steered direction in which the steered wheels are steered, which corresponds to the fourth lane keep assist current value Ir4* (lane keep assist torque). If the steering direction represented by the sign of the control steering torque Ts is different from the steered direction represented by the sign of the fourth lane keep assist current value Ir4*, the switch unit 67 selects the fourth lane keep assist current value Ir4* received at the first input terminal, and outputs the fourth lane keep assist current value Ir4* as the lane keep assist current value Iro*.

If the steering direction represented by the sign of the control steering torque Ts is the same as the steered direction represented by the sign of the fourth lane keep assist current value Ir4*, the switch unit 67 selects zero received at the second input terminal, and outputs zero as the lane keep assist current value Iro*. This is because it is considered that the driver is steering the vehicle toward the target travel line when the steering direction represented by the sign of the control steering torque Ts is the same as the steered direction represented by the sign of the fourth lane keep assist current value Ir4*. As described above, the dead band where the control steering torque Ts is zero is set in the region where the absolute value of the detected steering torque T is equal to or smaller than the predetermined value T2. This can restrain frequent inversions of the sign of the control steering torque Ts in the region where the detected steering torque T is small. This can restrain frequent switching between the fourth lane keep assist current value Ir4* and zero and can therefore restrain frequent fluctuations in motor torque generated by the electric motor 18.

In this modification, if the sign of the control steering torque Ts is different from that of the fourth lane keep assist current value Ir4*, the switch unit 67 selects the fourth lane keep assist current value Ir4* and outputs the fourth lane keep assist current value Ir4* as the lane keep assist current value Iro*. For example, the switch unit 67 may determine that the sign of the control steering torque Ts is different from that of the fourth lane keep assist current value Ir4* when the product of the control steering torque Ts and the fourth lane keep assist current value Ir4* is equal to or smaller than zero (zero or a negative value).

If the sign of the control steering torque Ts is the same as that of the fourth lane keep assist current value Ir4*, the switch unit 67 selects zero and outputs zero as the lane keep assist current value Iro*. For example, the switch unit 67 may determine that the sign of the control steering torque Ts is the same as that of the fourth lane keep assist current value Ir4* when the product of the control steering torque Ts and the fourth lane keep assist current value Ir4* is larger than zero (a positive value).

When the steering direction represented by the sign of the control steering torque Ts is the same as the steered direction represented by the sign of the fourth lane keep assist current value Ir4*, it is considered that the driver is steering the vehicle toward the target travel line. If the lane keep assist torque is generated even though the driver is steering the vehicle toward the target travel line, a steering response (steering reaction force) may be significantly reduced, whereby a steering feel may be degraded or the vehicle may return too much toward the target travel line. In this modification, the lane keep assist current value Iro* is zero when the steering direction represented by the sign of the control steering torque Ts is the same as the steered direction represented by the sign of the fourth lane keep assist current value Ir4*. This can appropriately give the driver a steering response when he/she is steering the vehicle toward the target travel line. This can improve a steering feel and can also restrain the vehicle from returning too much toward the target travel line.

Figure 13:
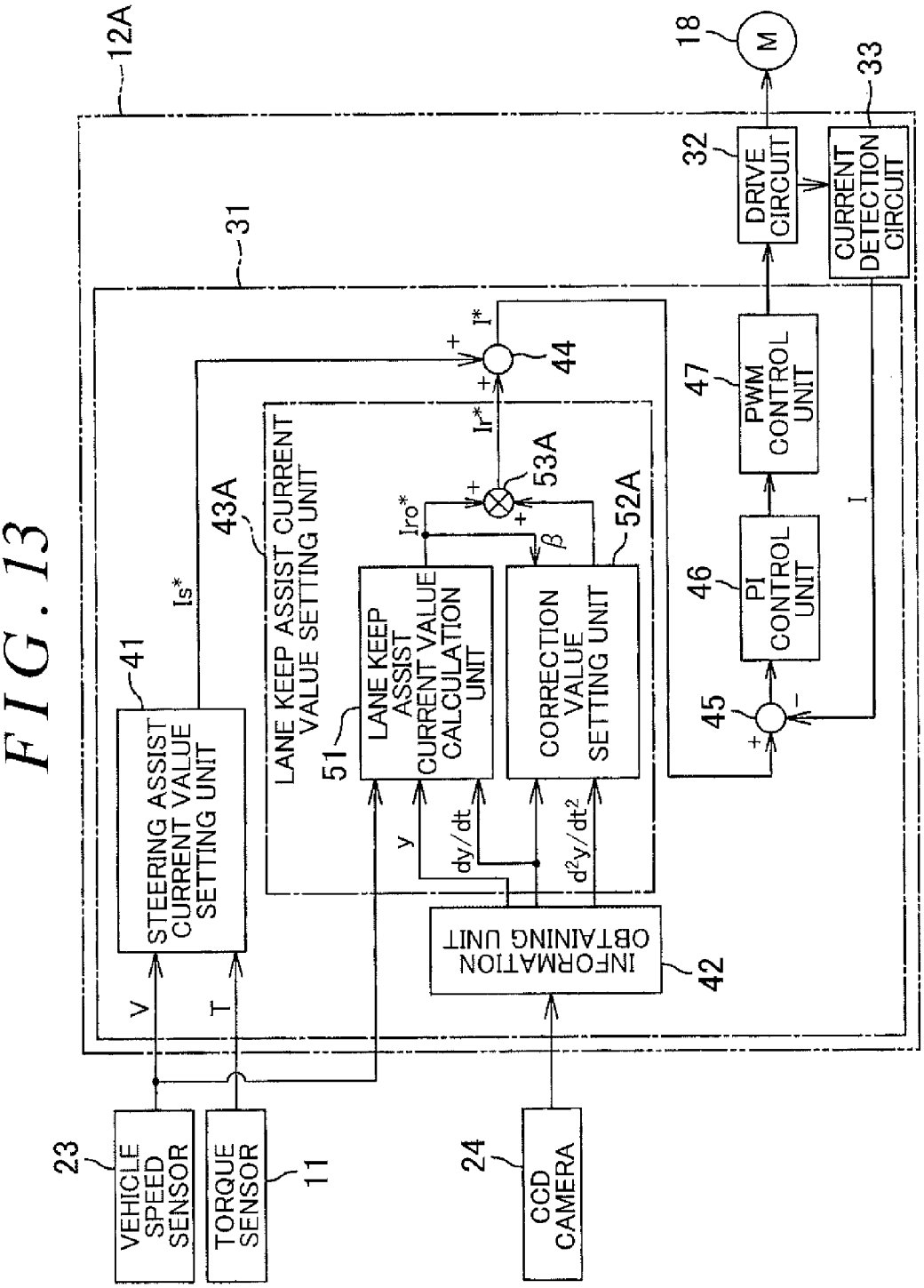
FIG. 13 is a block diagram showing another example of the configuration of the ECU.

FIG. 13 is a block diagram showing another example of the configuration of the ECU. In FIG. 13, the portions corresponding to the portions shown in FIG. 2 are denoted by the same reference characters.

An ECU 12A in FIG. 13 is different from the ECU 12 in FIG. 2 in the configuration of a lane keep assist current value setting unit 43A. The lane keep assist current value setting unit 43A includes a lane keep assist current value calculation unit 51, a correction value setting unit 52A, and a correction value addition unit 53A. The lane keep assist current value calculation unit 51 has the same composition as that of the lane keep assist current value calculation unit 51 in FIG. 2. The lane keep assist current value calculation unit 51 may have the same configuration as that in the modification shown in FIG. 11.

The correction value setting unit 52A calculates a correction value β based on the lateral deviation change rate dy/dt, the second derivative value $d^2y/dt^2$ of the lateral deviation y, and the lane keep assist current value Iro* calculated by the lane keep assist current value calculation unit 51. Operation of the correction value setting unit 52A will be described in detail later. The correction value addition unit 53A corrects the lane keep assist current value Iro* calculated by the lane keep assist current value calculation unit 51 by adding the correction value β set by the correction value setting unit 52A to the lane keep assist current value Iro*. The corrected lane keep assist current value (Iro*β) is applied as a final lane keep assist current value Ir* to the target current value calculation unit 44.

Figure 14:
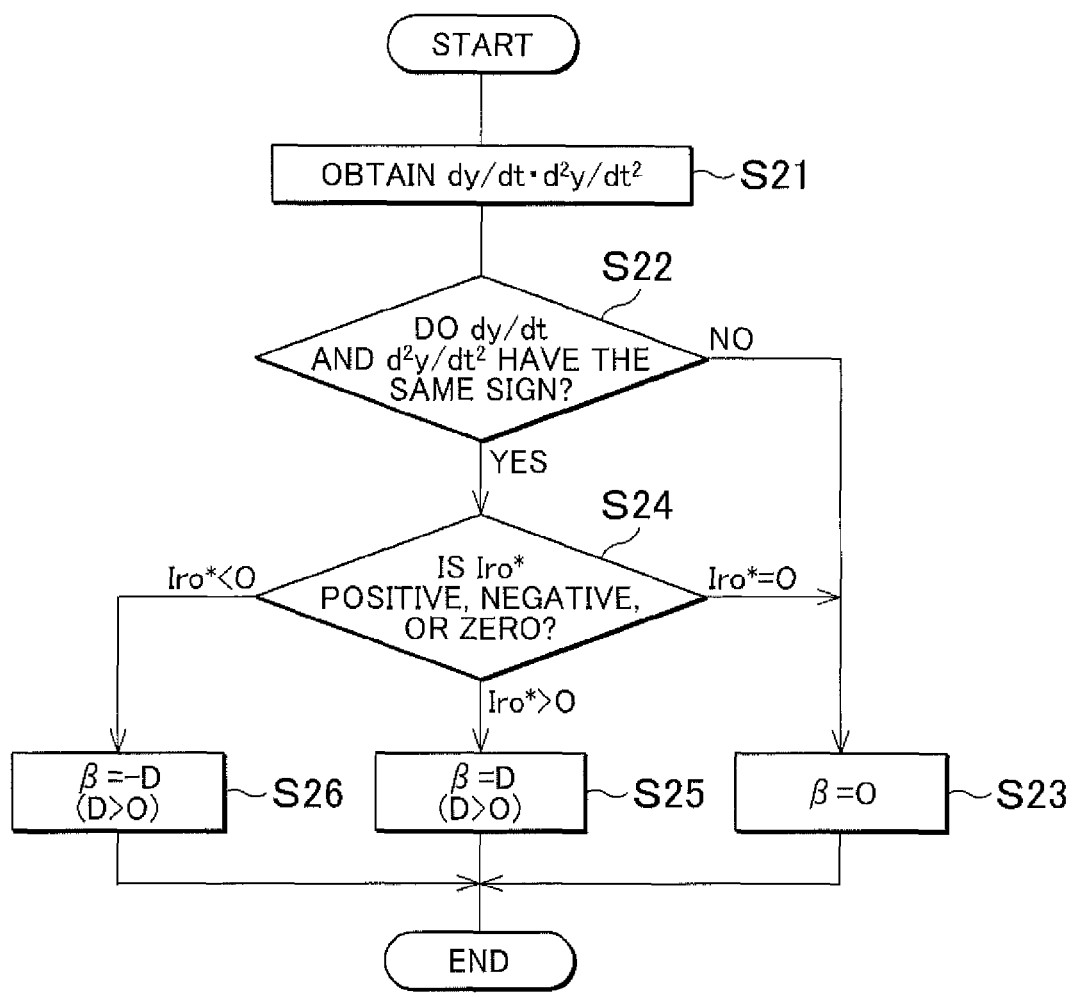
FIG. 14 is a flowchart illustrating an example of operation of a correction value setting unit.

FIG. 14 is a flowchart illustrating an example of operation of the correction value setting unit 52A. The process of FIG. 14 is repeatedly performed in predetermined calculation cycles.

The correction value setting unit 52A obtains the lateral deviation change rate dy/dt and the second derivative value $d^2y/dt^2$ of the lateral deviation y (step S21). The correction value setting unit 52A determines if the sign of the lateral deviation change rate dy/dt is the same as that of the second derivative value $d^2y/dt^2$ of the lateral deviation y (step S22).

For example, the correction value setting unit 52A may determine that the sign of the lateral deviation change rate dy/dt is the same as that of the second derivative value $d^2y/dt^2$ of the lateral deviation y when the product of the lateral deviation change rate dy/dt and the second derivative value $d^2y/dt^2$ of the lateral deviation y is positive, and may determine that the sign of the lateral deviation change rate dy/dt is different from that of the second derivative value $d^2y/dt^2$ of the lateral deviation y when the product of the lateral deviation change rate dy/dt and the second derivative value $d^2y/dt^2$ of the lateral deviation y is zero or negative.

If the correction value setting unit 52A determines that the sign of the lateral deviation change rate dy/dt is different from that of the second derivative value $d^2y/dt^2$ of the lateral deviation y (step S22: NO), it sets the correction value β to zero (step S23). In this case, the correction value addition unit 53A outputs the lane keep assist current value Ira* calculated by the lane keep assist current value calculation unit 51 as it is. The correction value setting unit 52A thus ends the process of the current calculation cycle.

If the correction value setting unit 52A determines in step S22 that the sign of the lateral deviation change rate dy/dt is the same as that of the second derivative value $d^2y/dt^2$ of the lateral deviation y (step S22: YES), it proceeds to step S24. In step S24, the correction value setting unit 52A determines if the lane keep assist current value Iro* calculated by the lane keep assist current value calculation unit 51 is a positive value, a negative value, or zero.

If the correction value setting unit 52A determines that the lane keep assist current value Iro* is a positive value (Iro*>0), it sets the correction value β to a predetermined positive value D (D>0) (step S25). In this case, the correction value addition unit 53A outputs the sum of the lane keep assist current value Iro* (Iro*>0) calculated by the lane keep assist current value calculation unit 51 and the correction value β (=D). The correction value setting unit 52A thus ends the process of the current calculation cycle.

If the correction value setting unit 52A determines in step S24 that the lane keep assist current value Iro* is a negative value (Iro*<0), it sets the correction value β to a predetermined negative value −D (step S26). In this case, the correction value addition unit 53A outputs the sum of the lane keep assist current value Iro* (Iro*<0) calculated by the lane keep assist current value calculation unit 51 and the correction value β (=−D). The correction value setting unit 52A thus ends the process of the current calculation cycle.

If the correction value setting unit 52A determines in step S24 that the lane keep assist current value Iro* is zero (Iro*=0), it sets the correction value β to zero (step S23). In this case, the correction value addition unit 53A outputs the lane keep assist current value Iro* (Iro*=0) calculated by the lane keep assist current value calculation unit 51 as it is. The correction value setting unit 52A thus ends the process of the current calculation cycle.

In this modification as well, if the sign of the lateral deviation change rate dy/dt is the same as that of the second derivative value $d^2y/dt^2$ of the lateral deviation y, the lane keep assist current value Iro* calculated by the lane keep assist current value calculation unit 51 can be corrected so that its absolute value increases. The vehicle can therefore be rapidly returned toward the target travel line if it deviates from the target travel line.

Although the embodiment of the present invention is described above, the present invention may be carried out in other forms. For example, a limiter that limits the absolute value of the third lane keep assist current value Ir3\* (=Ir1\*+Ir2\*) to a predetermined range may be provided between the addition unit 63 (see FIGS. 5 and 11) and the multiplication unit 65.

Although the above embodiment includes the multiplication unit 65 (see FIGS. 5 and 11), the multiplication unit 65 may be omitted. The vehicle speed gain setting unit 64 is not required in the case where the multiplication unit 65 is omitted.

In the above embodiment, the steering assist current value setting unit 41 sets the steering assist current value Is* by using the steering torque T (specifically, based on the steering torque T and the vehicle speed V). However, the steering assist current value setting unit 41 may set the steering assist current value Is* by using a steering angle.

Although the modification of the lane keep assist current value calculation unit 51 (see FIG. 11) includes the control steering torque setting unit 66, the control steering torque setting unit 66 may be omitted. In the case where the control steering torque setting unit 66 is omitted, the detected steering torque T detected by the torque sensor 11 is applied to the switch unit 67 instead of the control steering torque Ts. In this case, when the steering direction represented by the sign of the detected steering torque T is different from the steered direction represented by the sign of the fourth lane keep assist current value Ir4\*, the switch unit 67 selects the fourth lane keep assist current value Ir4\* received at the first input terminal and outputs the fourth lane keep assist current value Ir4\* as the lane keep assist current value Iro*. When the steering direction represented by the sign of the detected steering torque T is the same as the steered direction represented by the sign of the fourth lane keep assist current value Ir4\*, the switch unit 67 selects zero received at the second input terminal and outputs zero as the lane keep assist current value Iro*.

Although the above embodiment is described with respect to an example in which the present invention is applied to an electric power steering system, the present invention is also applicable to other vehicle steering systems such as a steer-by-wire system.

The present invention is also applicable in an autonomous driving mode in which the steering wheel 2 is not steered by the driver.

What is claimed is:

1. A steering assist device, comprising:
    an electric motor that applies a steering driving force to a steering operation mechanism of a vehicle; and
    a processor programmed to:
    obtain a lateral deviation of the vehicle from a target travel line, a lateral deviation change rate or a rate of change in the lateral deviation per unit time, and a rate of change in the lateral deviation change rate per unit time,
    set a steering assist current value corresponding to a target value of steering assist torque,
    calculate a lane keep assist current value that makes the lateral deviation and the lateral deviation change rate closer to zero, based on the lateral deviation and the lateral deviation change rate obtained,
    correct the calculated lane keep assist current value so that an absolute value of the lane keep assist current value increases, if the lateral deviation change rate and the rate of change in the lateral deviation change rate per unit time obtained are both either a positive value or a negative value,
    calculate a target current value by using the set steering assist current value and the corrected lane keep assist current value, and drivingly control the electric motor based on the calculated target current value.

2. The steering assist device according to claim 1, wherein the calculated lane keep assist current value is corrected by multiplying the lane keep assist current value by a correction gain that is larger than one, if the lateral deviation change rate and the rate of change in the lateral deviation change rate per unit time obtained are both either a positive value or a negative value.

3. The steering assist device according to claim 2, wherein the correction gain is calculated based on the lateral deviation change rate and the rate of change in the lateral deviation change rate per unit time obtained.

4. The steering assist device according to claim 1, wherein the calculated lane keep assist current value is corrected by adding a correction value having a same positive or negative sign as that of the lane keep assist current value to the lane keep assist current value, if the lateral deviation change rate and the rate of change in the lateral deviation change rate per unit time obtained are both either a positive value or a negative value.

\* \* \* \* \*